Dec. 23, 1924.
E. CULOTTA
GEM SETTING MACHINE
Filed April 30, 1923  8 Sheets-Sheet 2
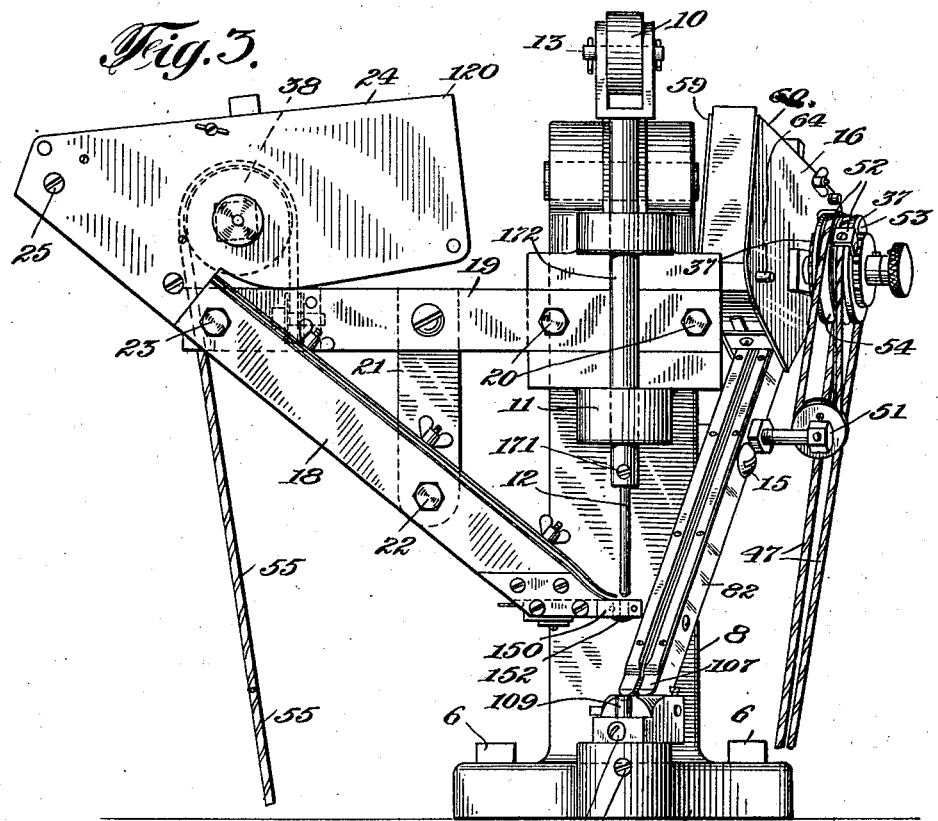
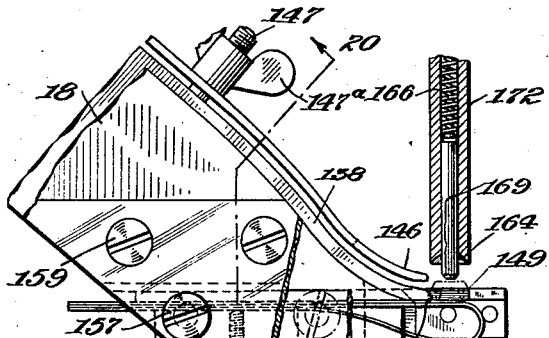
INVENTOR
Edward Culotta
BY Frederick V. Winter
his ATTORNEY Dec. 23, 1924.
E. CULOTTA
GEM SETTING MACHINE
Filed April 30, 1923
1,520,013
8 Sheets-Sheet 3
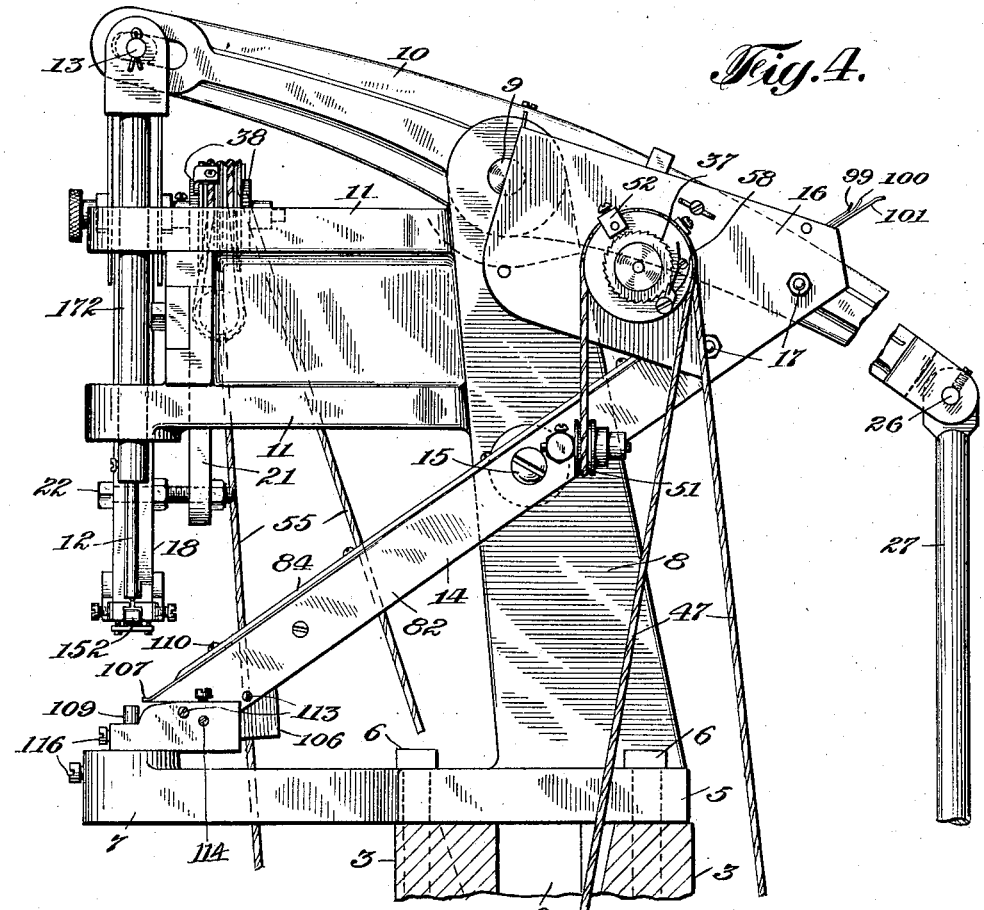
Fig. 4.
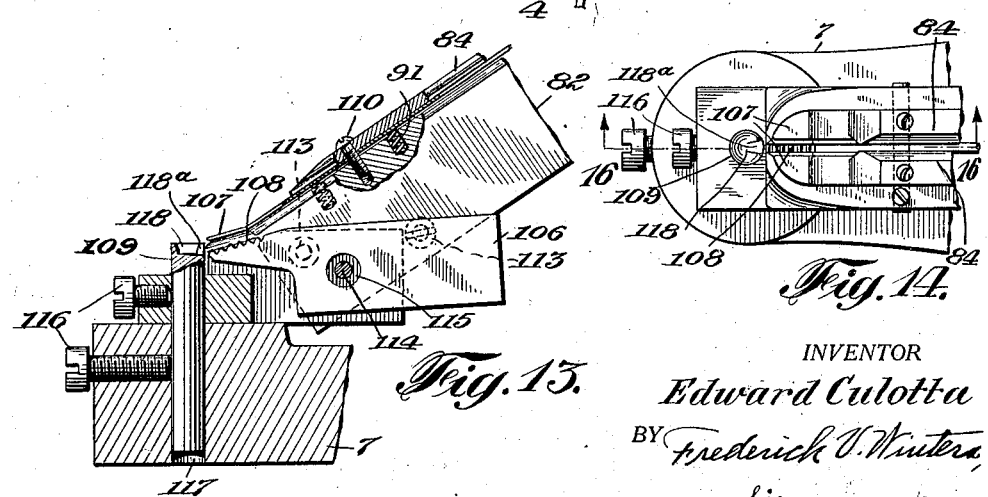
Fig. 13.
Fig. 14.
INVENTOR
Edward Culotta
BY Frederick V. Winters,
his ATTORNEY Dec. 23, 1924.
E. CULOTTA
1,520,013
GEM SETTING MACHINE
Filed April 30, 1923  8 Sheets-Sheet 4
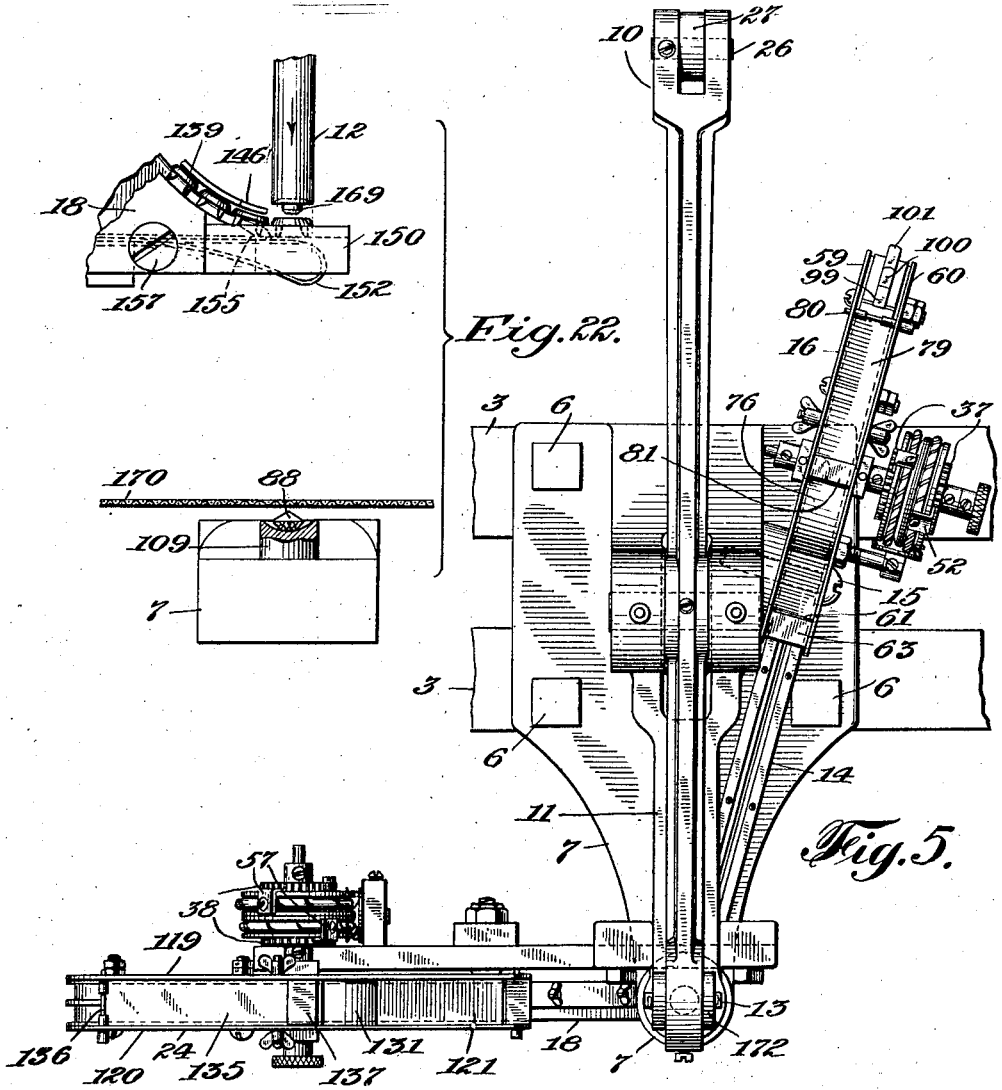
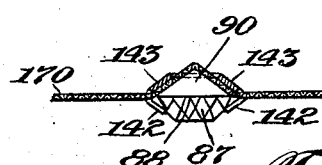
INVENTOR
Edward Culotta
BY Frederick V. Winters
his ATTORNEY

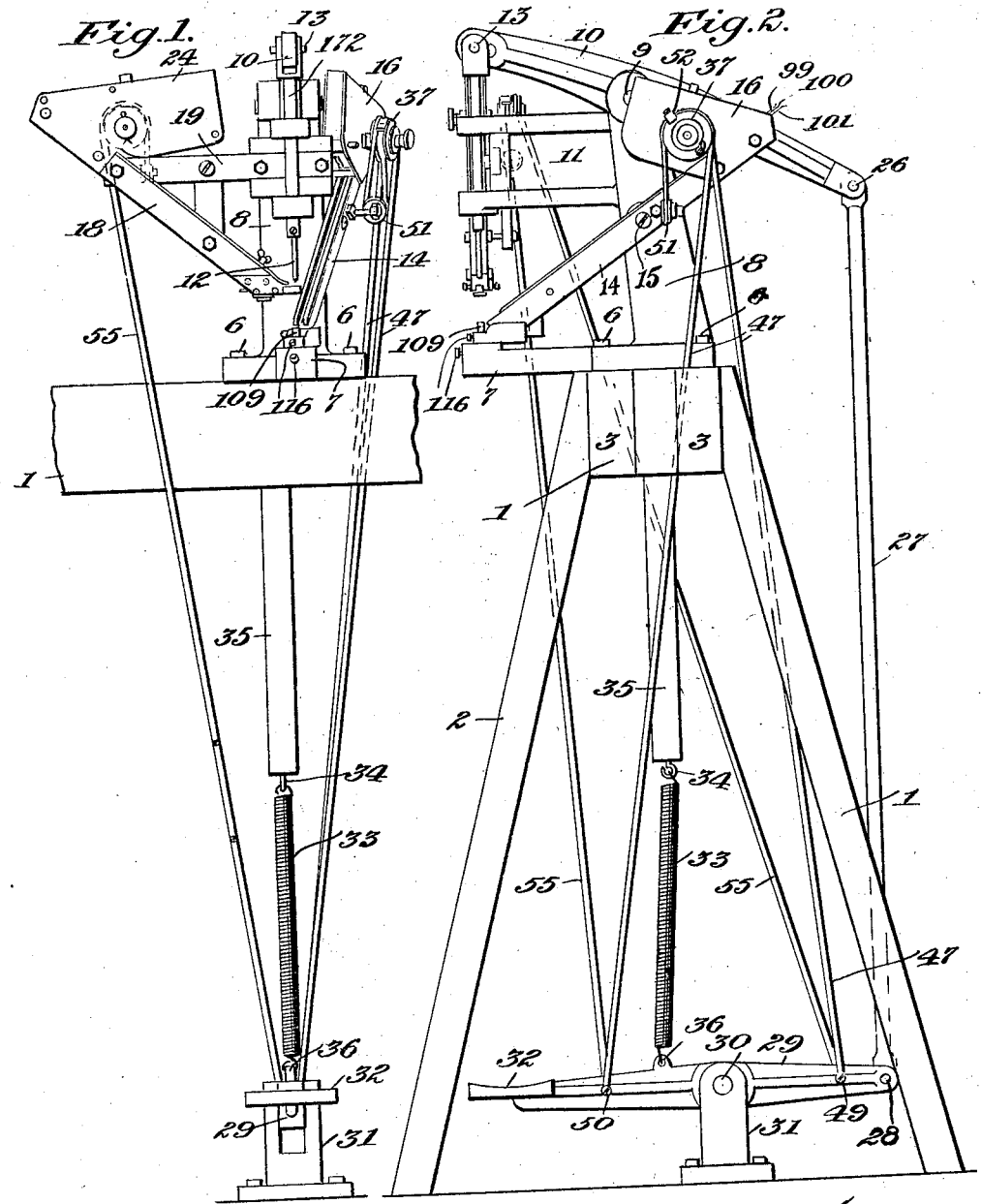

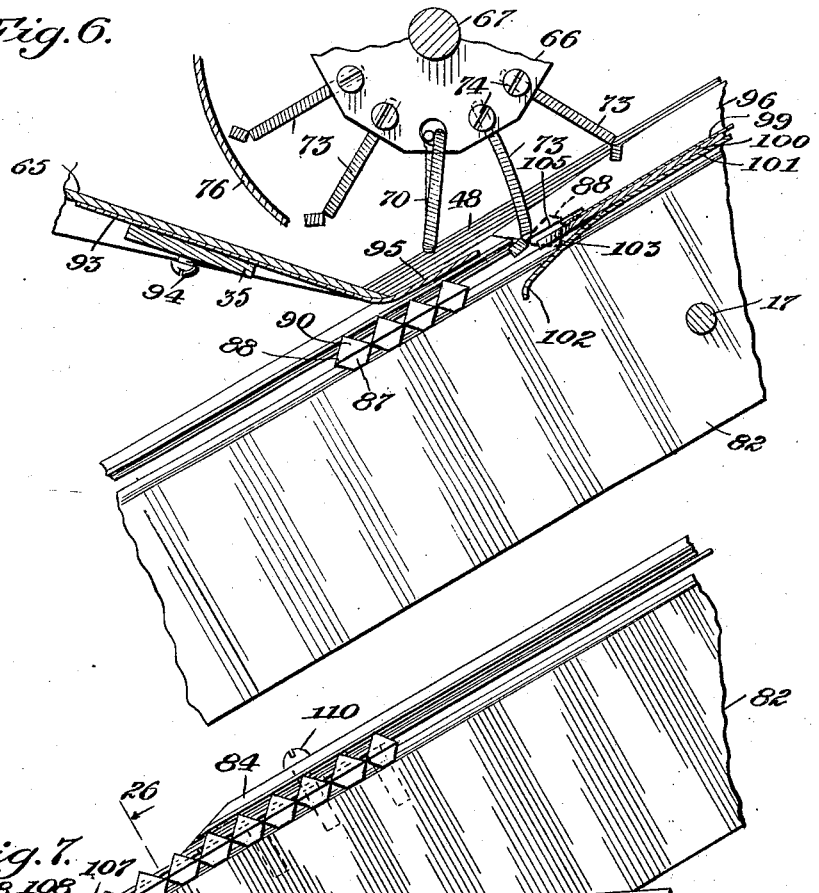
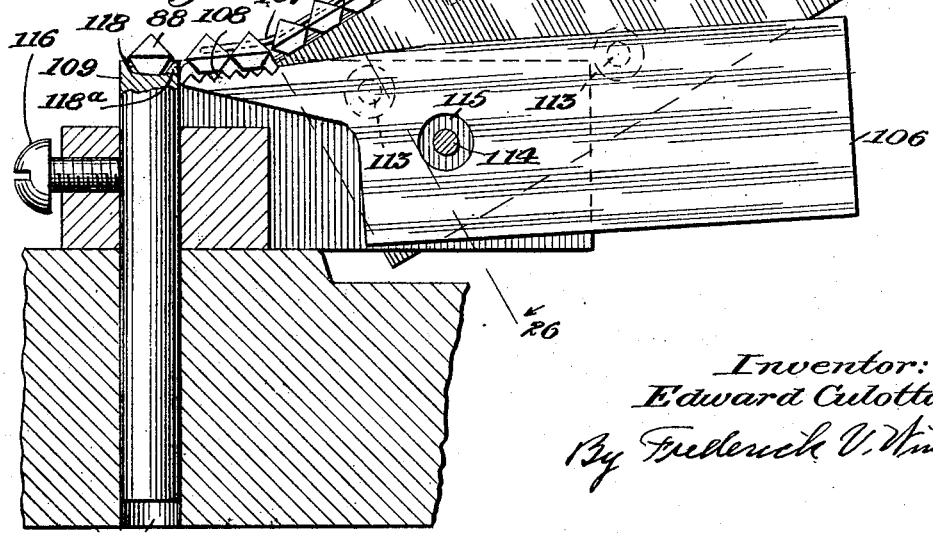

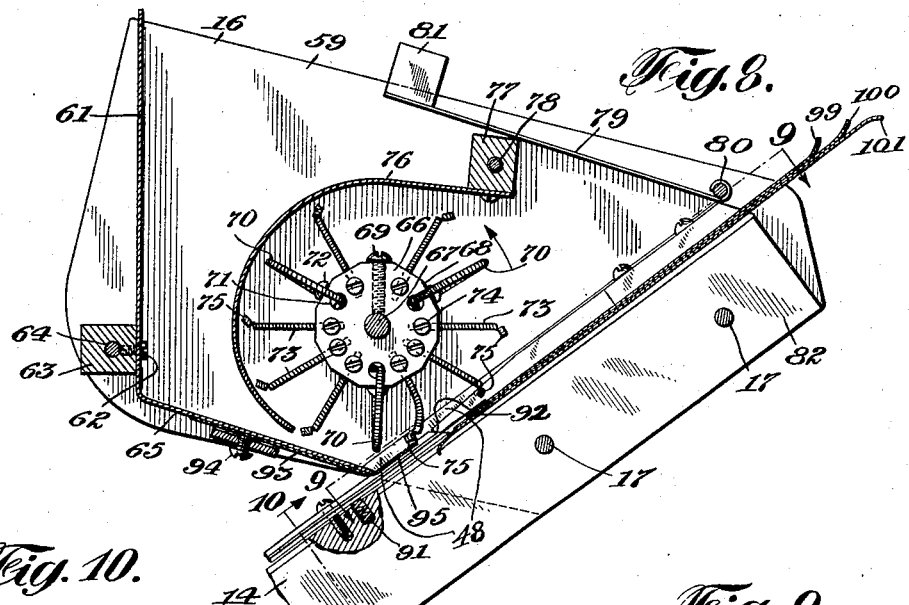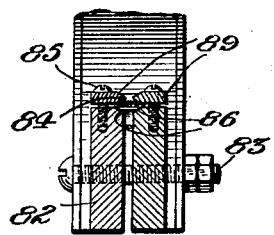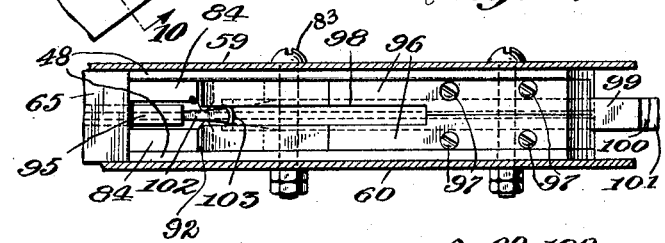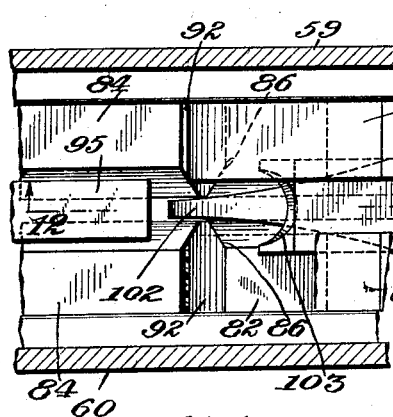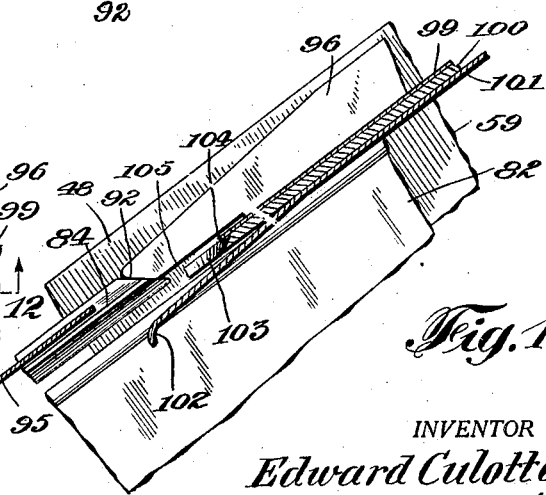

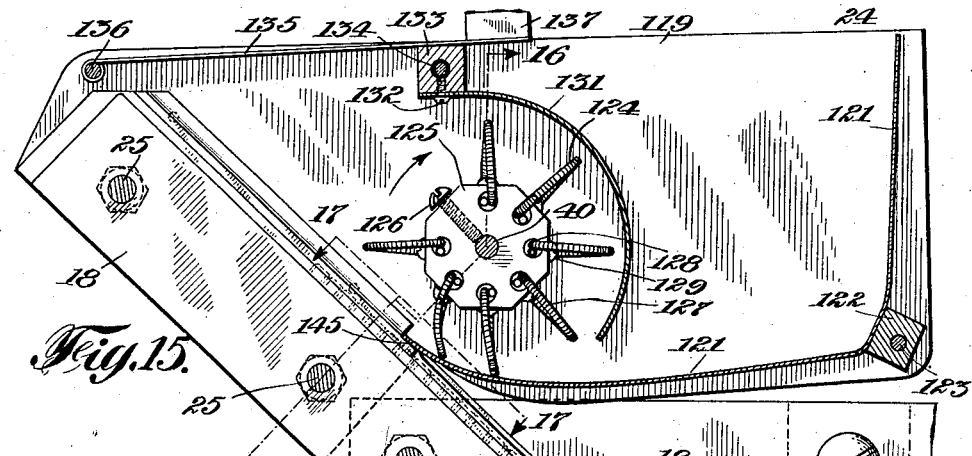

Dec. 23, 1924. 1,520,013
E. CULOTTA
GEM SETTING MACHINE
Filed April 30, 1923   8 Sheets-Sheet 8
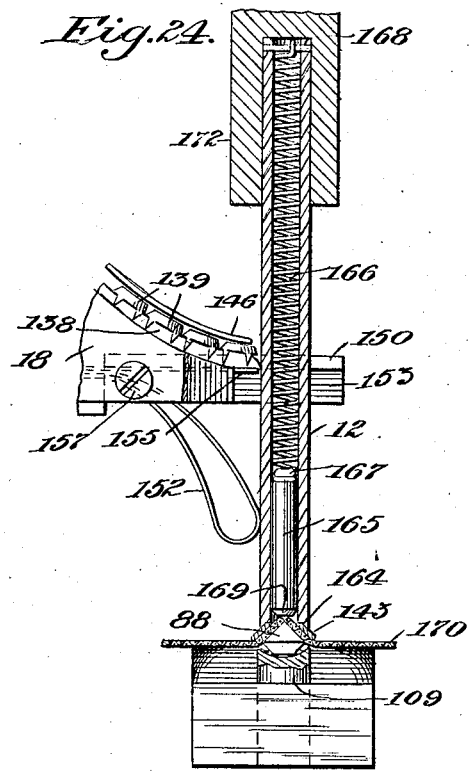
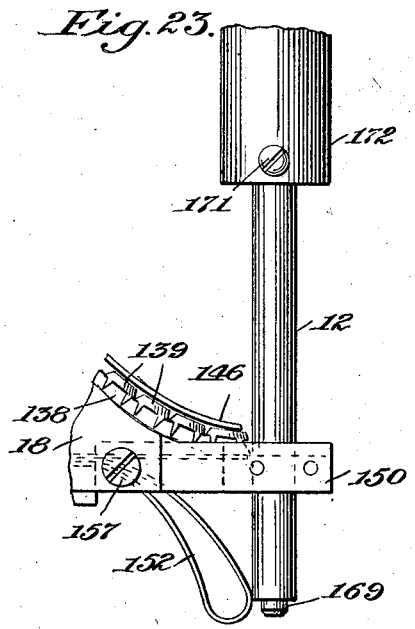
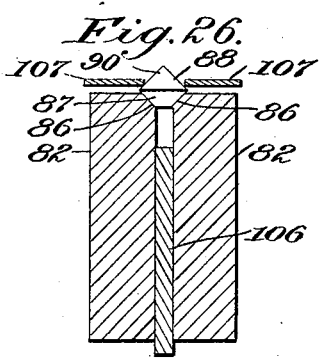
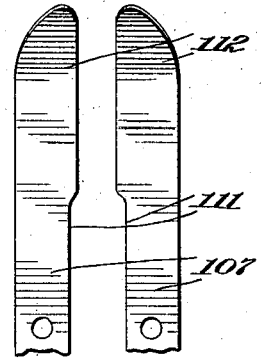
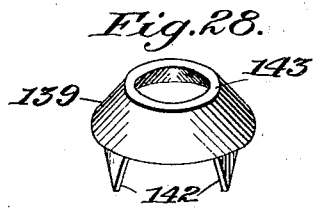
*Inventor:*
*Edward Culotta,*
By Frederick V. Winters,
Att'y.

Patented Dec. 23, 1924.

1,520,013

UNITED STATES PATENT OFFICE.

EDWARD CULOTTA, OF NEW YORK, N. Y.

GEM-SETTING MACHINE.

Application filed April 30, 1923. Serial No. 635,778.

*To all whom it may concern:*

Be it known that I, EDWARD CULOTTA, a citizen of the United States, residing at New York, in the county and State of New York, have invented certain new and useful Improvements in Gem-Setting Machines, of which the following is a full, clear, and exact specification.

This invention relates to machines for setting or attaching artificial gems or jewels to dress goods, or the like, for the purpose of providing ornamental trimming, and has for its object to provide mechanism for automatically feeding said gems one at a time and continuously from a hopper to an anvil, and for simultaneously feeding the settings or attaching devices one at a time and continuously from another hopper to a position above said anvil, whereby a vertically reciprocating plunger arranged in line with said anvil will during its downward movement pick up one of said settings and, after pressing the prongs of said setting through a piece of dress goods placed above the gem on the anvil, will clinch said prongs about the gem and thus attach the latter to the cloth. The gems are fed to the anvil in reversed position with the points of their bottoms uppermost, so that the position in which said gems are to be set on the cloth may be readily determined by pressing said cloth down over said bottom point of each gem until the position of said point can be clearly discerned through the cloth. It will be understood, of course, that the cloth is placed over the gem on the anvil in inverted position, that is, the goods is arranged with its outer face down and its inner face up, whereby the backs of the settings will be on the inner face of the goods while the gems will be secured to the outer face thereof.

A special object of the invention is to provide an improved form of chute for conveying the gems in continuous succession, from their hopper to the anvil, said chute being adjustable to accommodate gems of different dimensions. Another object is to provide an improved agitator in the gem hopper for assuring the proper feeding of the gems to the chute, and in combination with said agitator means is provided for displacing from the entrance to the chute any gems which drop into said entrance in an improper position. Means is also provided in the entrance from the gem hopper to the chute for preventing gems which fall in proper position in said entrance from being dislodged by the agitator. Adjustable means is also provided at the lower end of the gem chute for retarding the feed of the gems until the lowest gem in the chute is moved on to the anvil by the finger of the operator, said adjustable means being capable of accommodating gems of different dimensions.

Another special object of the invention is to provide a chute for conveying the settings continuously and successively from their hopper to a point directly over the anvil, said chute also being adjustable to accommodate settings of different dimensions. An improved form of agitator is provided in the hopper for the settings to assure their proper feeding to the chute. Means is also provided at the lower end of the chute for the settings to releasably support the lowest setting in position to be picked up by the plunger on its downward stroke, said releasable supporting means being flexible and adapted to be depressed to permit the setting and plunger to pass the same on their way to the anvil. The lower end of the chute for the settings is further provided with means for supporting the next lowest setting while the lowest one is being carried down by the plunger, so that the feeding of said next lowest setting to its proper position below the plunger, when the latter is raised, will be assured.

The invention further contemplates means for simultaneously and continuously rotating the agitators in both hoppers, so as to insure the continuous feeding of the gems and settings to their proper positions with respect to the anvil, whereby the reciprocations of the plunger for setting the gems on the dress goods may be carried on without interruption and the attaching of the gems thus greatly expedited as compared with their being attached by hand according to the practice heretobefore employed. The plunger may be reciprocated by the same means which operate the agitators in the two hoppers, and said means is preferably a treadle which may be actuated by the foot of the operator so as to leave his hands free for advancing the gems one at a time from the lower end of the gem chute to the anvil and for holding the dress goods above said anvil and below the lower end of the chute for the settings where it will be in proper position for having said gems attached thereto when the plunger is reciprocated. Other objects will appear as the description proceeds.

The invention will be as hereinafter described in connection with the accompanying drawings, which constitute part of this specification, and then more specifically defined in the claims at the end of the description.

In the accompanying drawings, where similar reference characters are used to designate corresponding parts throughout the several views:

Figure 1 is a front elevation of a machine constructed substantially in accordance with my invention, the ends of the table to which supporting legs are attached, being broken away.

Figure 2 is a side elevation of the machine with the supporting legs for the table shown.

Figure 3 is a front elevation of the portion of the machine arranged above the table drawn to a larger scale.

Figure 4 is a side view of the portion of the machine arranged above the table, also drawn to a larger scale than that which is used in Figures 1 and 2.

Figure 5 is a plan view of the machine.

Figure 6 is a detailed section of the upper portion of the gem chute and adjacent portions of the gem hopper and agitator, the parts being drawn to a still larger scale and showing how the gems are fed from said hopper to said chute. An improperly positioned gem is shown in dotted lines in this figure in the entrance from the hopper to the chute, and the spring underlying said entrance is shown depressed so that it will dislodge said gem when the arm of the agitator in contact therewith has passed it.

Figure 7 is a detailed sectional view, on the same scale as Figure 6, showing the lower end portion of the gem chute with the gems lined up therein and one of said gems arranged on the anvil.

Figure 8 is a detailed sectional view of the complete gem hopper and adjacent portion of the gem chute.

Figure 9 is a section on the line 9—9 of Figure 8.

Figure 10 is a section on the line 10—10 of Figure 8.

Figure 11 is a fragmentary section corresponding to the left-hand end portion of Figure 9 and drawn to a larger scale to more clearly illustrate the entrance to the gem chute from the gem hopper.

Figure 12 is a section on the line 12—12 of Figure 11.

Figure 13 is a longitudinal vertical section of the lower end portion of the gem chute and the anvil support.

Figure 14 is a plan view of the same parts.

Figure 15 is a sectional view of the hopper for the settings and the upper portion of the chute therefor.

Figure 16 is a section on the line 16—16 of Figure 15.

Figure 17 is a section on the line 17—17 of Figure 15, with parts broken away.

Figure 18 is a section on the line 18—18 of Figure 15.

Figure 19 is a broken side view of the lower end of the chute for the settings, the plunger being shown in section and in a position ready to engage a setting which is illustrated in dotted lines.

Figure 20 is a section on the line 20—20 of Figure 19.

Figure 21 is a broken plan view of the lower portion of the chute for the settings.

Figure 22 is a broken view of the lower end of the chute for the settings, and of the anvil, a gem being illustrated on said anvil, and a piece of dress goods arranged between said anvil and plunger.

Figure 23 is a side view of the lower end of the chute for the settings and the plunger, the latter being shown at an intermediate point in its descent.

Figure 24 is a view similar to Figure 22 showing the positions of the parts upon the completion of the setting operation.

Figure 25 is a section of a piece of cloth or dress goods with a gem attached thereto.

Figure 26 is a section on the line 26—26 of Figure 7.

Figure 27 is a detailed view of the lower end portions of the spring strips which retain the gems on the roughened support at the lower end of the chute adjacent to the anvil, and Figure 28 is a detailed view of one of the settings.

As best illustrated in Figures 1 and 2 of the drawings, the main parts of the machine are mounted upon a table 1 supported on suitable legs 2. Said table is preferably made quite narrow from front to back, and it may comprise three longitudinal strips or timbers 3 set on edge as shown in Figure 2. Portions of the middle timber may be cut away leaving spaces through the table, as indicated at 4 in Figure 4, to permit the free passage of the belts which operate the double-acting ratchets for turning the agitators in the hoppers for the gems and settings.

The main portion of the machine, which is mounted on the table 1, has a base plate 5 bolted at 6 to said table and having a forward extension 7 projecting for some distance in front of the table. A standard 8 rises from the base plate 5 and in its upper end portion there is journaled at 9 an intermediately pivoted lever 10. A forwardly extending arm 11 is mounted on the standard 8 directly above the extension 7 on the base plate, and the front end of said arm 11 serves to guide the plunger 12 which is loosely pivoted at 13 to the front end of the lever 10. The gem chute 14 is secured at 15 to the side of the standard 8, and the gem hopper 16 is bolted at 17 to the upper end of said chute. The chute 18 for the settings is supported by a cross bar 19 bolted at 20 to the front end portion of the arm 11, said cross bar having a depending member 21 which is bolted at 22 to said chute 18, the cross bar 19 itself being bolted to said chute at 23, see Figure 3. The hopper 24 for the settings is bolted at 25 to the upper end portion of the chute 18.

The rear end of the lever 10 is pivoted at 26 to the upper end of the connecting rod 27. The lower end of said rod is pivotedly connected at 28 to the rear end of an intermediately pivoted treadle 29, journaled at 30 in a floor bracket 31, see Figures 1 and 2. The front end of the treadle 29 carries the foot piece 32 on which the foot of the operator is placed for depressing the front end of the treadle and raising its rear end. After being depressed, the treadle is automatically returned to its normal position, illustrated in Figure 2, by a spring 33 having its upper end connected to a hook 34 attached to a rigid member 35 depending from the table 1 while the lower end of said spring is connected to an ear 36 formed in the upper edge of the treadle in front of the journal 30 thereof.

In each of the hoppers 16 and 24 there is arranged a rotary agitator which will hereinafter be described in detail. These agitators are rotated by means of double-acting ratchets 37 and 38 on the respective hoppers. These double-acting ratchets are of well known construction and one of them is shown in section in Figure 16 where it will be seen that it comprises two pulleys or sheaves 39 arranged side by side and loosely mounted on the agitator shaft 40, there being ratchet disks 41 and 42 fixed to said shaft 40 by set screws 43 and 44, respectively, at opposite sides of said pulleys, and spring-pressed pawls 45 and 46 mounted on the outer faces of said pulleys to engage, respectively, with said ratchet disks 41 and 42, whereby rotation of either of the pulleys 38 in one direction will cause the rotation of the agitator shaft. The pulleys of the double-acting ratchets 37 and 38 are rotated by means of belts 47 and 55, respectively. One end of the belt 47 is connected at 49 to the rear end portion of the treadle 29, see Figures 1 and 2, while the other end of said belt is connected at 50 to the front end portion of said treadle. The rear bight of the belt 47 is arranged in the rear of the table 1, while the front bight thereof passes through space 4 in the center of the table as shown in Figure 4. The intermediate portion of the belt 47 passes around the two pulleys of the double-acting ratchet and below an idle pulley 51 best shown in Figures 1, 2, 3 and 4. Said belt 47 is suitably clamped, as at 52, to each of the pulleys 53 and 54 of the ratchet 37.

The belt 55 for operating the ratchet device 38 on the hopper 24, has one end secured to the rear end portion of the treadle 29 and its other end secured to the front end portion of said treadle, as shown in Figure 2. Said belt 55 is passed over the pulleys 39 of the ratchet device 38 and around the idle pulley 56 best shown in Figure 16. The belt 55 is fastened to said pulleys by clamps 57 best shown in Figure 5. The rear bight of the belt 55 passes through space 4 in the table, and the front bight of said belt is arranged in front of the table, see Figure 2. Both belts 47 and 55 are taut, and when the treadle 29 is rocked in either direction the two pulleys of each of the ratchet devices will be rotated in opposite directions. The arrangement of the pawls 45 and 46 of the ratchet device 38, and the corresponding pawls of the ratchet device 37, one of which is shown at 58 in Figure 4, is such that the agitators in both hoppers will be rotated continuously as the treadle is rocked back and forth by the foot of the operator and the spring 33.

The gem hopper 16 comprises parallel side plates 59 and 60, which are secured to opposite sides of the chute 14 by the bolts 17, and a strip 61 arranged vertically between the front end portions of said plates 59 and 60. Said strip 61 is secured by a screw 62, Figure 8, to a cross piece or block 63 which is positioned between the side plates of the hopper by a transverse pin 64. Strip 61 has an extension 65 at its lower end which is arranged on an incline and reaches to the chute 14. The bottom of the hopper is thus formed by said extension 65 of the strip 61 and the upper portion of the chute 14, as best shown in Figure 8. Within the hopper 16 an agitator 66 is rotatably mounted on a shaft 67 journaled in the side plates 59 and 60. Said shaft 67 extends beyond the hopper at one side and carries the double-acting ratchet device 37 already described. The agitator 66 comprises a hub 68 secured to the shaft 67 by a set screw 69. Said hub 68 carries a plurality of radially extending resilient arms preferably made of coiled wire. Certain of said resilient arms are in the form of round loops 70 having their end portions inserted in transverse passages 71 in the hub and clamped therein by set screws 72. The other resilient arms of the agitator are straight sections of coiled wire 73 extending into radial sockets in the edge of the hub and secured therein by set screws 74. The looped arm 70 and straight arms 73 are substantially the same length but said straight arms preferably have angularly bent extensions 75 at their outer ends.

A curved guard strip 76 is secured to a block 77 fastened between the side plates 59 and 60 of the hopper 16 by a cross pin or bolt 78, and said strip extends between said side plates of the hopper above the agitator and in front of the same, terminating at its lower end a short distance above the extension 65 of the strip 61 which forms part of the bottom of said hopper. The space between the block 77 and the rear end of the hopper 16 is normally closed by a strip 79 hinged at its rear end to a pin or bolt 80 extending between the side plates 59 and 60. When closed, said hinged strip 79 rests upon the block 77, and the free end of said strip is preferably provided with a finger piece 81 by which it may be raised to permit access to the agitator and rear portion of the hopper. Gems are fed into the hopper through the uncovered front portion thereof and passed down between the strip 61 and guard 76. When the gems reach the inclined extension 65 of said strip 61, they are fed by gravity along said extension strip below the lower end of the guard strip 76 to the lowest point of the hopper which is located at the junction of said extension strip 65 with the chute 14.

The gem chute 14 comprises spaced longitudinal members or rails 82 secured together and held apart by bolts 83, and strips 84 secured along the upper edges of the members or rails 82 by means of screws 85. The upper edges of the rails 82 are beveled off at the inside, as at 86 to correspond to and support the front portions 87 of the gems 88, which are shaped generally like truncated cones, see Figures 6, 7 and 26. The inner edges of the strips 84 are also beveled at 89, Figure 10, to correspond to the lower conical end portions 90 of the gems 88, it being understood that said gems are arranged upside down in the chute, as shown in Figures 6 and 7, and that the points on the lower conical end portions 90 extend up between the two strips 84. Springs 91 are interposed between the rails 82 and strips 84 at intervals to permit ready adjustment of the latter with respect to the former to accommodate gems of different dimensions.

The strips 84 extend upward below the gem hopper for a considerable distance past the lower end of the extension 65 of the strip 61, which extension is held in places by strips 48 in the hopper, and said upper ends of said strip 84, are beveled as at 92, see Figures 8, 11 and 12. A spring leaf 93 is fastened at 94 to the under surface of the extension 65 of the strip 61, and has a portion 95 overlying the greater portion of the space between the ends of the strips 84 which project beyond said extension 65. The extension 95 serves to prevent the properly set stones from being disturbed by other stones falling from the hopper back of the resilient loops 70 and arms 73 of the agitator. At the upper end of the gem chute strips 96 are fastened by screws 97, Figure 9, to the upper edges of the rails 82, said strips reaching to and overlapping the beveled ends 92 of the strips 84. Said strips 96 meet throughout their upper portions along their adjacent edges, but said edges are cut away along the lower portions of said strips to form a slot 98, best shown in Figure 9. Adjustably clamped between the strips 96 and the rails 82 by the screws 97 are three narrow strips of spring metal 99, 100 and 101. These three strips are superposed upon one another, and the bottom strip 101, has a tapered lower end portion 102 which extends beyond the ends of the other strips and also past the upper ends of the strips 84, as best shown in Figures 11 and 12. The middle strip 100 has a rounded and tapered notch 103 formed in its lower end which terminates at a distance from the upper ends of the strips 84 sufficient to permit the gems to pass one at a time below said strips 84 and into the chute formed by said strips and the beveled upper edges of the rails 82.

The lower extremity 104 of the top spring strip 99 is cut square across and slightly overhangs the notch 103 in the lower end of the strip 100, so that should a gem, which has fallen in proper position into the entrance to the chute between the upper end of the strips 84 and the notched lower end of the spring strip 100, be engaged by the arms of the agitator in the gem hopper, the circumferential edge of said gem will be engaged below said protruding end 104 of the top spring 99, as indicated in dotted lines in Figure 6, and prevent it from being dislodged from said chute entrance. The lower end portion of the members 96 are undercut at 105, Figures 6 and 12, to permit the lower end of the spring strip 99 to yield upwardly to a certain extent when the circumferential edge of the gem is forced below it by the action of the agitator arm. The tapered lower end 102 of the spring strip 101 constitutes a yielding floor for the entrance to the gem chute, as it extends below the space between the upper ends of the strips 84 and the notched lower end of the strip 100, which constitutes said entrance. As best shown in Figure 12, said tapered lower end portion of the strip 101 is bent downward at a slight angle to the main portion of said strip, and as shown in Figure 6, it may be depressed to a greater angle when the arms of the agitator force a gem into the entrance in improper position. In such an event, as soon as the agitator arm, which is in engagement with an improperly placed gem, passes beyond the same, said tapered extension 102 will spring upward to its normal position as shown in Figure 12 and dislodge said gem from the chute entrance.

It will be understood that the agitator propels the gems from the lower front portion of the hopper, where they enter below the curved guard strip 76, into the rear upper portion of said hopper from whence certain of said gems are guided to the chute entrance by the groove formed by the slot 98 between the cut-away lower edges of the members 96, and the underlying spring strip 99. Those of the gems which happen to drop into the chute entrance in proper position with their flattened front faces downward pass directly into the chute, while those gems which drop into said entrance in improper position are dislodged by the agitator arms of the end portion 102 of the spring strip 101, as already explained.

The gems which enter and pass down the gem chute become lined up as shown in Figures 6 and 7. The gems at the lower end of said chute are yieldingly held therein by an adjustable supporting member 106 and a pair of spring strips or plate springs 107 illustrated in detail in Figure 27 and which project from the lower ends of the strip 84 above and substantially parallel to the roughened upper edge 108 of the adjustable member 106. Said upper end portion 108 of the adjustable member 106 is roughened to retard the movement of the gems at the extreme lower end of the gem chute which is arranged immediately behind and on a level with the anvil 109. The spring strips or plates 107 are fastened at their upper ends between the strips 84 and rails 82 of the gem chute by means of screws 110, Figures 7 and 13, and the adjacent edges 111 of the portions of said plates 107 which are arranged below the strips 84 are in line with the undercut beveled edges of said strips 84, but the portions 112 of the adjacent edges of the plates 107 which project beyond the lower ends of the strips 84 are arranged nearer together, as shown in Figures 26 and 27 so as to overlie the circumferential edges of the gems and take the place of the strips 84 in retaining said gems in the chute until they reach the anvil. The gem at the extreme lower end of the chute is designed to be advanced therefrom to the anvil by the finger of the operator.

The supporting member 106 is adjustably held between the rails 82 at the lower end of the gem chute by means of set screws 113. When said set screws are loosened, said member 106 may be adjusted about a cross-pin 114 in order to alter the position of the roughened upper end portion 108 with respect to the lower extremities of the spring plates 107, whereby the outlet or lower end of the gem chute may be adjusted to accommodate gems of different dimensions. The member 106 has an opening 115 for the passage of the cross-pin 114, and said opening is made considerably larger than said pin, as best shown in Figures 7 and 13, to permit free adjustment of said member.

The anvil 109 preferably consists of a vertical cylindrical rod which is adjustably held by set screws 116 in a passage 117 in the front end of the arm 7 of the base plate 5 of the machine. The upper end of said anvil is made concave or recessed, as at 118, in order to properly center a gem thereon and to also guide the prongs of the setting into clinched positions under the gem, as shown in Figures 24 and 25. The side of the anvil adjacent the gem chute is cut away or notched at 118$^a$, Figures 7, 13 and 14 to guide the gems from said chute into said anvil.

The hopper 24 for the settings has parallel side plates 119 and 120 which are secured to the upper end of the chute 18 by the bolts 25, as best shown in Figures 15 and 16. A bent strip 121 forms one end wall of the hopper 24 and a portion of its bottom, said strip being suitably secured to a block 122 fastened between the side plates 119 and 120 by a cross-pin 123. The portion of the strip 121 forming part of the bottom of the hopper extends to the chute 18 and is preferably curved upwardly at its extremity so that it reaches below the agitator 124 which is mounted in the hopper on the shaft 40 to be rotated by the ratchet device 38 already described. Said agitator 124 comprises a hub 125 which is secured by means of a set screw 126 to the shaft 40, and a plurality of radiating resilient arms 127 which are of sufficient length to brush against the curved end of the bottom portion of the strip 121, as clearly shown in Figure 15. The resilient arms 127 are preferably formed of coiled wire bent into loops with their extremities passed through transverse openings 128 in the hub 125 and secured therein by set screws 129. Certain of these looped arms are preferably made pointed or triangular in shape, as shown at 130 in Figure 16, while the others may be substantially round as also indicated in the same figure.

A curved guard strip 131 is arranged above and to the right in the agitator in the hopper 24, said strip being secured at its upper end by a screw 132 to a block 133 fastened between the side plates 119 and 120 of the hopper by means of a transverse pin or bolt 134. The lower end of said curved guard strip terminates a short distance above the bottom of the hopper, and the settings, which are placed in the hopper between said guard strip and the end wall 121, pass through the space below the guard to a point immediately below the agitator. The upper end portion of the chute 18 also constitutes a part of the bottom of the hopper 24, and the space at the top of said hopper between the upper extremity of said chute and the block 133 is normally closed by a plate 135 hinged on a pin or bolt 136 extending between the side walls of the hopper at the extreme left-hand end of the same. Said plate 135, when closed, rests upon the block 133, and the free end thereof may be provided with a finger piece 137 for conveniently raising said plate to permit access to the agitator. Said plate is normally closed in order to prevent the settings from being thrown out of the hopper under the action of the agitator.

The chute 18 has a projecting tongue or rib 138 running centrally along its upper edge which serves as a guide or track for the settings 139, one of which is shown in detail in Figure 28. Said rib or track may be formed by a strip 140 secured between a pair of strips 141 and protruding above the upper edges of said latter strips a sufficient distance to permit the settings to straddle the rib and have two of its spurs 142 arranged on each side thereof and resting on or reaching approximately to the upper edges of said strips 141. As best shown in Figure 28, each setting comprises a ring-shaped portion 143 from which the four spurs 142 project at equal distant points around the same. Said spurs normally extend at right angles to the plane of the ring portion of the setting, and said ring portion comprises a metal band which is radially inclined, to conform to the conical surface of the pointed lower portion or base of a gem as will be seen in Figure 25.

To guide the settings onto the rib or track 138 at the upper end of the chute 18, beveled strips 144 are suitably secured along the opposite side walls of the hopper 24 from the curved extremity of the bottom member 121 to the upper extremity of said chute. These beveled strips 144 are clearly shown in Figures 15, 16 and 17, as spaced far enough away from the sides of the rib 138 to permit the spurs on the settings 139 to straddle said rib. The space between said strips 144 and rib 138 is insufficient, however, to permit a setting to straddle said rib unless two of its four prongs are arranged on each side thereof. It will thus be seen that the settings can only be seated on the rib 138 when in proper position to travel down the chute, and that said settings are properly seated on said rib only when two of its spurs are arranged on each side thereof.

The agitator 124 revolves clockwise, as shown in Figure 15, and feeds the settings upward onto the portion of the chute having beveled guiding strips 144. Such of the settings as first fall properly astride the rib 138 pass directly down the chute, while such settings as first fall in improper position are thrown upward again by the radial resilient arms 127 of the agitator which fits down into the groove between the beveled strips 144. It will be noted that the curved extremity of the strip 121 which extends below the agitator, is spaced above the rib 138, being supported on notches or steps 145 at the lower ends of the strips 144, a distance sufficient to permit properly placed settings to pass below it one at a time but insufficient to allow improperly placed settings to pass down the chute.

In order to retain the settings in proper position on the rib or track 138 during their passage down the chute, a plate 146 is arranged above and parallel to the upper edge of said rib. Said plate 146 extends from the curved end portion of the strip 121, adjacent the lower ends of the beveled strips 144 at the upper end of the chute, to a point directly above the lower end of the rib 138, as shown in Figures 3, 15 and 19. Said plate 146 is supported on one of the strips 141 of the chute by means of thumb nuts 147$^a$ on screws 147 arranged at intervals along the chute in order to permit adjustment to acccommodate settings of different dimensions. Coiled springs 148 are interposed at intervals between the plate 146 and the strip 141 of the chute to which it is connected, so that when the thumb nuts 147$^a$ on screws 147 are loosened, said plate will be automatically raised by said springs to aid in making the desired adjustment to accommodate settings of different dimensions.

At the lower end of the chute 18 and beyond the ends of the rib 138 and plate 146, which are substantially co-extensive, there is arranged a pocket 149 for holding a setting in vertical alinement with the anvil 109. Said pocket 149 is formed by side members 150, having their adjacent edges notched at 151, and a looped spring 152 normally extending horizontally from the bottom of the chute 18 below said cut-out portions of said side members. The free ends of said members 150 extend inwardly toward each other as at 153, Figure 21, to inclose the outer end of the pocket 149 which is bounded at the sides by the cut-out portions 151 of said side members and at the inner end by the extremity of the rib 138. Said rib is preferably beveled off at its end to facilitate the feeding of the settings successively into the pocket 149, said beveled end of the rib being clearly illustrated at 154 in Figures 19 and 21.

It will be noted that the lower end of the rib 138 projects slightly beyond the lower ends of the strips 141 of the chute 18, and in order to properly support the setting which is arranged next to the one in the pocket 149, as shown in Figures 22, 23 and 24, a plate spring 155 is secured to the bottom of the chute above the looped spring 152. Said spring 155 extends to the end of the rib 138, and serves as a rest for the spurs of the setting arranged at the bottom of the chute next to the setting in the pocket 149, whereby said setting is prevented from rocking on the beveled end 154 of the rib 138 and the maintenance of said setting in proper position to enter said pocket in its turn is thus assured.

The side members 150 for the pocket 149 are carried by resilient strips 156 which are detachably secured to the opposite lateral faces of the chute 18 by clamping screws 157 carried by blocks 158 secured to said chute by screws 159. The inner faces of said blocks 158 are under-cut at 160 for the reception of said spring strips 156, and the set screws 157 are adjustable in said under-cut portions to clamp said strips as best shown in Figure 20. The looped spring 152 and plate spring 155 arranged above it are secured to the bottom of the chute 18 by a clamping block 161 also shown in Figure 20. Said block 161 fits into a recess 162 in the bottom of the chute and is adjustably held in place by screws 163 passed through an underlying strip 161$^a$. The folded ends of the looped spring 152 and the superposed end of the plate spring 155 are clamped by said screws 163 in the recess 162 above the block 161. Said block is arranged far enough away from the pocket 149 to permit the looped spring 152 to be depressed, as shown in Figures 23 and 24, when the plunger 12 moves downward through the pocket 149. As illustrated in broken lines in Figure 21, the side members 150 of the pocket, which are carried by the spring strips 156, are adapted to yield outwardly during the passage of the plunger 12 through the pocket.

The plunger 12 is of tubular form and its bottom end is concave as shown at 164 in Figures 19 and 24. Within said tubular plunger 12 there is mounted a cylindrical stem 165 yieldingly held with its lower end protruding a slight distance below the plunger, as shown in Figures 19 and 23, by means of a coiled spring 166 housed in the plunger and connected at its lower end to the stem at 167 and at its upper end to a cross-pin 168 at the upper end of the plunger. Said spring 166 not only yieldingly holds the stem 165 in its projected position but also prevents said stem from dropping entirely out of the plunger. The lower end of the stem is beveled or rounded off at 169 to guide the same into the opening in the ring portion 143 of the setting arranged in the pocket 149 as the plunger descends from the position shown in Figure 22 to that illustrated in Figure 23. The stem 165 is of a size to snugly fit said opening in the setting, so that after the projecting end of said stem is inserted through the opening the setting is frictionally retained thereon and is consequently carried down with the plunger from the pocket 149 at the lower end of the chute 18 to the anvil which is arranged in vertical alinement with said pocket and plunger. When the plunger reaches the anvil, the spurs 142 of the setting carried thereby are forced through the cloth 170, Figures 22, 24 and 25, and clinched about the gem 88, as best shown in Figure 24, and during this operation the stem 165 is pushed up or retracted into the tubular plunger 12 against the action of the spring 166. As soon as the plunger is raised, said spring acts to project the stem 165 again below the end of the plunger as shown in Figure 23.

The tubular plunger 12 is detachably fastened by a set screw 171 in a reciprocating member 172 which is guided by the arm 11 of the frame of the machine and pivoted at 13 to the front end of the lever 10, as hereinbefore explained. The plunger is moved downward by pressure of the foot of the operator on the front end 32 of the treadle 29, through the connecting rod 27 extending between the rear end of said treadle and the rear end of the lever 10, see Figure 2, while said plunger is raised, when the pressure of the operator's foot is removed from the front end of the treadle, by the spring 33 which raises the front end of said treadle and consequently causes the rear ends of said treadle and lever 10 to swing downward.

As already explained, the rocking of the treadle by the foot of the operator and the spring 33 simultaneously actuates the agitators in the hoppers for the gems and settings through the instrumentality of the belts 47 and 55 and double-acting ratchet devices 37 and 38 so that the feeding of the gems and settings to their chutes is continuous and there are always gems at the lower end of the gem chute to be advanced one at a time by the finger of the operator on to the anvil 109, and there are always settings in the lower end of their chutes to be automatically fed one at a time to the pocket 149 where they are picked up by the plunger 12 on its successive reciprocations. It will thus be seen that the machine may be operated rapidly for attaching gems to dress goods or other material as already explained, the operation for setting each gem, consisting first of advancing the lowest gem in its chute onto the anvil 109 by the finger of the operator, next, the positioning of the dress goods or other material 170 over said gem on the anvil, the proper location of said gem being discernible through the material by pressing the same over the point 90 thereof as hereinbefore explained, and finally, the depression of the plunger by pressure of the operator's foot on the front end of the treadle 29.

I claim:

1. In a machine for attaching gems to dress goods, the combination with an anvil for supporting a gem in inverted position, of a plunger for releasably holding a setting having depending spurs, and means for moving the plunger toward the anvil for forcing said spurs through a piece of dress goods, arranged between the anvil and plunger, and clinching said spurs about the gem on the anvil.

2. In a machine for attaching gems to dress goods, the combination with an anvil for supporting a gem in inverted position, of a plunger for releasably holding a setting having depending spurs, and means for moving the plunger toward the anvil for forcing said spurs through a piece of dress goods, arranged between the anvil and plunger, and clinching said spurs about the gem on the anvil, the latter having a concave face for the purpose specified.

3. In a machine for attaching gems to dress goods, the combination with an anvil for supporting a gem in inverted position, of a plunger for releasably holding a setting having depending spurs, and means for moving the plunger toward the anvil for forcing said spurs through a piece of dress goods, arranged between the anvil and plunger, and clinching said spurs about the gem on the anvil, the faces of said plunger and anvil being concave for the purpose specified.

4. In a machine of the character described, the combination with an anvil for supporting a gem in inverted position, of a plunger having a projection for supporting a setting having depending spurs, means for moving the plunger toward the anvil for forcing said spurs through a piece of dress goods, arranged between said anvil and plunger, and clinching said spurs about the gem on the anvil, said projection being adapted to yield during said clinching operation.

5. In a machine of the character described, the combination with an anvil for supporting a gem in inverted position, of a plunger having a central stem normally projecting therefrom for engaging in a ring-shaped setting having depending spurs, means for moving the plunger with respect to the anvil for forcing said spurs through a piece of dress goods, arranged between said anvil and plunger, and clinching said spurs about the gem on the anvil, said stem being retractible into the plunger during the clinching operation.

6. In a machine of the character described, the combination with an anvil for supporting a gem in inverted position, of a plunger having a central stem normally projecting therefrom for engaging in a ring-shaped setting having depending spurs, means for moving the plunger with respect to the anvil for forcing said spurs through a piece of dress goods, arranged between said anvil and plunger, and clinching said spurs about the gem on the anvil, said stem being retractible into the plunger during the clinching operation, and resilient means arranged in the plunger above said stem for automatically projecting the latter when the plunger is raised.

7. In a machine of the character described, the combination with an anvil for supporting a gem in inverted position, of a plunger having a central stem normally projecting therefrom for engaging in a ring-shaped setting having depending spurs, means for moving the plunger with respect to the anvil for forcing said spurs through a piece of dress goods, arranged between said anvil and plunger, and clinching said spurs about the gem on the anvil, said stem being retractible into the plunger during the clinching operation, and the end of said stem being tapered to guide the same into the setting.

8. In a machine of the character described, the combination with an anvil for supporting a gem in inverted position, of a plunger having a central stem normally projecting therefrom for engaging in a ring-shaped setting having depending spurs, means for moving the plunger with respect to the anvil for forcing said spurs through a piece of dress goods, arranged between said anvil and plunger, said stem being retractible into the plunger during the clinching operation, and a coiled spring housed in the plunger and secured to it and to the stem for projecting said stem from the plunger and limiting the extent of its projection therefrom.

9. In a machine of the character described, the combination with an anvil for supporting a gem in inverted position, of a plunger, means for successively feeding settings into the path of said plunger, and means for reciprocating said plunger to apply a setting for attaching said gem to a piece of dress goods arranged between said anvil and plunger.

10. In a machine of the character described, the combination with an anvil for supporting a gem in inverted position, of a plunger, means for successively feeding settings into the path of said plunger, and means for reciprocating said plunger to apply a setting for attaching said gem to a piece of dress goods arranged between said anvil and plunger, said plunger having means for picking up and holding the setting thereon during its movement toward the anvil.

11. In a machine of the character described, the combination with an anvil for supporting a gem in inverted position, of a plunger, means for successively feeding ring-shaped settings having depending spurs into the path of said plunger, and means for reciprocating said plunger for forcing said spurs through a piece of dress goods arranged between the anvil and plunger, and clinching said spurs about the gem on the anvil.

12. In a machine of the character described, the combination with an anvil for supporting a gem in inverted position, of means for successively feeding gems in inverted position to a point adjacent said anvil, a plunger for releasably holding a setting having depending spurs, and means for reciprocating said plunger for forcing said spurs through a piece of dress goods, arranged between the anvil and plunger, and clinching said spurs about the gem on the anvil.

13. In a machine of the character described, the combination with an anvil for supporting a gem in inverted position, of means for successively feeding gems in inverted position to a point adjacent said anvil, means for successively feeding the settings to a point above the anvil, said settings having depending spurs, and a reciprocating plunger adapted to pick up a setting, to force its spurs through a piece of dress goods, arranged between said anvil and plunger, and to clinch said spurs about the gem on the anvil.

14. In a machine of the character described, the combination with an anvil for supporting a gem in inverted position, of means for successively feeding gems in inverted position to a point adjacent said anvil, a plunger for releasably holding a setting having depending spurs, forcing said spurs through a piece of dress goods, arranged between said anvil and plunger, and clinching said spurs about the gem on the anvil, and means for simultaneously actuating said plunger and gem feeding means.

15. In a machine of the character described, the combination with an anvil for supporting a gem in inverted position, of means for successively feeding settings having depending spurs to a point above the anvil, a reciprocating plunger adapted to pick up a setting, to force its spurs through a piece of dress goods, arranged between said anvil and plunger, and to clinch said spurs around the gem on the anvil, and means for simultaneously actuating said plunger and feeding means for the settings.

16. In a machine of the character described, the combination with an anvil for supporting a gem in inverted position, of means for successively feeding gems in inverted position to a point adjacent said anvil, means for successively feeding settings having depending spurs to a point above said anvil, a reciprocating plunger adapted to pick up a setting, to force its spurs through a piece of dress goods arranged between said anvil and plunger, and to clinch said spurs about the gem on the anvil, and means for simultaneously actuating said plunger and the feeding means for the gems and settings.

17. A machine of the character described, the combination with an anvil for supporting a gem in inverted position, of a gem hopper, a chute for conveying the gems successively from said hopper to a point adjacent the anvil, an agitator in said hopper to aid in feeding the gems to the chute, a reciprocating plunger for releasably holding a setting having depending spurs and adapted to force said spurs through a piece of dress goods, arranged between said anvil and plunger, and to clinch said spurs about a gem on the anvil, and means for simultaneously actuating said plunger and the agitator in the gem hopper.

18. In a machine of the character described, the combination with an anvil for supporting a gem in inverted position, of a gem hopper, a chute for conveying gems successively from said hopper to a point adjacent said anvil, an agitator in said hopper to aid in feeding the gems to said chute, a plunger for releasably holding a setting having depending spurs, forcing said spurs through a piece of dress goods, arranged between said anvil and plunger, and clinching said spurs about a gem on the anvil, a treadle operatively connected to said plunger and means for actuating said agitator also connected to said treadle.

19. In a machine of the character described, the combination with an anvil for supporting a gem in inverted position, of a gem hopper, a chute for conveying gems successively from said hopper to a point adjacent said anvil, an agitator in said hopper to aid in feeding the gems to said chute, a plunger for releasably holding a setting having depending spurs, a lever to reciprocate said plunger for forcing the spurs of the setting through a piece of dress goods, arranged between said anvil and plunger, and clinching said spurs about a gem on the anvil, a treadle operatively connected to said lever, a double-acting ratchet device attached to said agitator, and a belt engaging said ratchet device, and having its ends secured to said treadle at opposite sides of its fulcrum, whereby said agitator and plunger are simultaneously actuated by the treadle.

20. In a machine of the character described, the combination with an anvil for supporting a gem in inverted position, of a hopper for holding settings having projecting spurs, a chute for successively conveying said settings from said hopper and delivering them to a point above the anvil with their spurs depending, an agitator in said hopper to aid in feeding the settings to the chute, a plunger adapted to pick up a setting, to force its spurs through a piece of dress goods arranged between said anvil and plunger, and to clinch said spurs about a gem on the anvil, and means for simultaneously actuating said agitator and reciprocating said plunger.

21. In a machine of the character described, the combination with an anvil for supporting a gem in inverted position, of a hopper for holding settings having projecting spurs, a chute for successively conveying said settings from said hopper and delivering them to a point above the anvil with their spurs depending, an agitator in said hopper to aid in feeding the settings to the chute, a plunger adapted to pick up a setting, to force its spurs through a piece of dress goods arranged between said anvil and plunger, and to clinch said spurs about a gem on the anvil, a lever for reciprocating said plunger, a treadle operatively connected to said lever, and means for actuating said agitator also connected to said treadle.

22. In a machine of the character described, the combination with an anvil for supporting a gem in inverted position, of a hopper for holding settings having projecting spurs, a chute for successively conveying said settings from said hopper and delivering them to a point above the anvil with their spurs depending, an agitator in said hopper to aid in feeding the settings to the chute, a plunger adapted to pick up a setting, to force its spurs through a piece of dress goods arranged between said anvil and plunger, and to clinch said spurs about a gem on the anvil, a lever for reciprocating said plunger, a treadle operatively connected to said lever, a double-acting ratchet device connected to said agitator, and a belt secured to said ratchet device and having its ends fastened to said treadle at opposite sides of its fulcrum, whereby the rocking of the treadle will simultaneously actuate said plunger and agitator.

23. In a machine of the character described, the combination with an anvil for supporting a gem in inverted position, a gem hopper, a chute for successively conveying gems from said hopper to a point adjacent the anvil, a hopper for holding settings having projecting spurs, a chute for successively conveying settings from their hopper to a point above the anvil with their spurs depending, a plunger adapted to pick up a setting from the lower end of the last mentioned chute, to force its spurs through a piece of dress goods arranged between said anvil and plunger, and to clinch said spurs about the gem on the anvil, a lever for reciprocating said plunger, a treadle operatively connected to said lever, agitators in the hoppers for the gems and settings, double-acting ratchet devices attached to said agitators, and belts applied to said ratchet devices and each having its ends secured to said treadle at opposite sides of its fulcrum, whereby the rocking of the treadle will simultaneously actuate the plunger and the agitators in both hoppers.

24. In a machine of the character described, the combination with an anvil for supporting a gem in inverted position, a gem hopper, a chute for successively conveying gems from said hopper to a point adjacent the anvil, a hopper for holding settings having projecting spurs, a chute for successively conveying settings from their hopper to a point above the anvil with their spurs depending, a plunger adapted to pick up a setting from the lower end of the last mentioned chute, to force its spurs through a piece of dress goods arranged between said anvil and plunger, and to clinch said spurs about the gem on the anvil, a lever for reciprocating said plunger, a treadle operatively connected to said lever, agitators in the hoppers for the gems and settings, double-acting ratchet devices attached to said agitators, and belts applied to said ratchet devices and each having its ends secured to said treadle at opposite sides of its fulcrum whereby the rocking of the treadle will simultaneously actuate the plunger and the agitators in both hoppers, there being a table for supporting the anvil above the treadle, and said table having a slot therein for the passage of said belts.

25. In a machine of the character described, the combination with an anvil for supporting a gem in inverted position, a gem hopper, a chute for successively conveying gems from said hopper to a point adjacent the anvil, a hopper for holding settings having projecting spurs, a chute for successively conveying settings from their hopper to a point above the anvil with their spurs depending, a plunger adapted to pick up a setting from the lower end of the last mentioned chute, to force its spurs through a piece of dress goods arranged between said anvil and plunger, and to clinch said spurs about the gem on the anvil, a lever for reciprocating said plunger, a treadle operatively connected to said lever, agitators in the hoppers for the gems and settings, double-acting ratchet devices attached to said agitators, and belts applied to said ratchet devices and each having its ends secured to said treadle at opposite sides of its fulcrum, whereby the rocking of the treadle will simultaneously actuate the plunger and the agitators in both hoppers, there being means attached to the treadle for returning the latter to normal position after it has been depressed by the operator.

26. In a machine of the character described, the combination with an anvil for supporting a gem in inverted position, of a reciprocating plunger for setting the gem mounted on the anvil onto a piece of dress goods, a gem hopper, a chute for conveying gems in inverted position successively from said hopper to a point adjacent the anvil, said chute comprising spaced rails having beveled inner edges to conform to the faces of the gems, and spaced strips arranged above said rails and having beveled inner edges to conform to the bases of said gems.

27. In a machine of the character described, the combination with an anvil for supporting a gem in inverted position, of a reciprocating plunger for setting the gem mounted on the anvil onto a piece of dress goods, a gem hopper, a chute for conveying gems in inverted position successively from said hopper to a point adjacent the anvil, said chute comprising spaced rails having beveled inner edges to conform to the faces of the gems, and spaced strips arranged above said rails and having beveled inner edges, to conform to the bases of said gems, said strips being adjustable with respect to said rails for accommodating gems of different dimensions.

28. In a machine of the character described, the combination with an anvil for supporting a gem in inverted position, of a reciprocating plunger for setting the gem mounted on the anvil onto a piece of dress goods, a gem hopper, a chute for conveying gems in inverted position successively from said hopper to a point adjacent the anvil, said chute comprising spaced rails having beveled inner edges to conform to the faces of the gems, and spaced strips arranged above said rails and having beveled inner edges to conform to the bases of said gems, screws adjustably connecting said strips to said rails, and springs interposed between said rails and strips, whereby the latter may be adjusted to accommodate gems of different dimensions.

29. In a gem setting machine, the combination with a chute, of a gem hopper communicating with said chute, and a rotary agitator arranged in said hopper and having radially extending flexible arms for the purpose specified.

30. In a gem setting machine, the combination with a chute, of a hopper communicating with said chute, and a rotary agitator arranged in the hopper and having radial arms formed of coiled wire.

31. In a gem setting machine, the combination with a gem chute, of a gem hopper communicating with said chute, and a rotary agitator arranged in said hopper and having radially extending resilient arms, some of said arms being in the form of loops for the purpose specified.

32. In a gem setting machine, the combination with a gem chute, of a gem hopper communicating therewith, and a rotary agitator arranged in said hopper, and having radially extending resilient arms, some of said arms being in the form of loops and others being straight, for the purpose specified.

33. In a gem setting machine, the combination with a gem chute, of a hopper communicating with said chute, and a rotary agitator in the hopper, said agitator comprising a hub having radial sockets and transverse passages in its edge portion, straight resilient arms secured in said radial sockets, and looped resilient arms secured in said transverse passages.

34. In a gem setting machine, the combination with a chute, of a hopper communicating with said chute, and a rotary agitator arranged in said hopper, said agitator comprising a hub having transverse passages in its edge portion, and loops of coiled wire extending radially from said hub and having their ends secured in said transverse passages.

35. In a gem setting machine, the combination with a chute, of a hopper communicating therewith, a rotary agitator arranged in said hopper and comprising a hub having radial sockets and transverse passages in its edge portion, loops of coiled wire extending radially from the hub and having their ends secured in said transverse passages, and straight arms of coiled wire extending radially from the hub and having their inner ends secured in said sockets.

36. In a gem setting machine, the combination with a chute, of a hopper communicating therewith, and a rotary agitator arranged in said hopper and having straight radial arms of resilient material with angularly bent tips at their outer ends for the purpose specified.

37. In a gem setting machine, the combination with a gem chute, of a hopper having an entrance leading to said chute, said entrance being constructed to allow the passage of only one gem at a time and only those which are arranged in inverted position for the purpose specified.

38. In a gem setting machine, the combination with a gem chute, of a hopper having an entrance leading to said chute, said entrance being constructed to allow the passage of only one gem at a time, and a yielding floor for said entrance adapted to expel gems which fall into said entrance in other than inverted position.

39. In a gem setting machine, the combination with a gem chute, of a hopper having an entrance communicating with said chute, said entrance being of a size to allow the passage of only one gem at a time, an agitator moveable across said entrance, means for expelling from the entrance gems which fall into the same in other than inverted position, and means for preventing the displacement by the agitator of gems which fall into said entrance in proper position.

40. In a gem setting machine, the combination with a gem chute, of a hopper having an entrance leading to said chute, and an agitator movable across said entrance, the latter being of a size to allow the passage of only one gem at a time, a resilient floor for said entrance adapted to expel gems which drop into the same in other than inverted position, and a resilient strip overlapping the edge of said entrance for preventing the displacement by the agitator of gems which fall into the entrance in proper position.

41. In a gem setting machine, the combination with a gem chute, of a hopper having an entrance leading to said chute, said entrance being of a size to allow the passage of only one gem at a time, an agitator movable across the entrance, one wall of said entrance being beveled, and a resilient strip overlapping said beveled wall for preventing the displacement by the agitator of gems which fall into the agitator in proper position.

42. In a gem setting machine, the combination with a gem chute, a hopper having an entrance leading to said chute, and an inclined groove leading to said entrance, and an agitator movable across the entrance and adapted to direct the gems into said groove, said entrance being of a size to permit the passage of only one gem at a time, and only those which are arranged in inverted position.

43. In a gem setting machine, the combination with a chute, of a hopper communicating with said chute, a rotary agitator in said hopper, and a curved guard extending above and at one side of said agitator in the hopper for the purpose specified.

44. In a gem setting machine, the combination with a chute, of a hopper communicating therewith, a rotary agitator arranged in the hopper, a curved partition in said hopper extending above and at the side of said agitator, said partition being spaced away from the bottom of the hopper for the purpose specified, and a movable cover for the portion of the hopper at the other side of the agitator.

45. In a gem setting machine, the combination with a chute, of a hopper having a passage communicating with said chute, and an agitator movable across said passage, the bottom of the hopper being inclined and having a groove leading to said passage.

46. In a gem setting machine, the combination with a chute, of a hopper having portions of its bottom inclined in different directions, a rotary agitator arranged in the hopper with its axis in vertical alinement with the lowest point of the bottom of the hopper between said inclined portions, there being an entrance to the chute arranged in one of said inclined portions of the bottom of the hopper and below the agitator.

47. In a gem setting machine, the combination with an inclined chute, of a hopper having a passage in its bottom communicating with said chute, three superposed strips extending along the chute and below the hopper, the lowest one of said strips extending below the passage leading from the hopper to the chute, the intermediate strip having a beveled notch constituting part of the walls of said passage, and the uppermost strip overhanging said beveled notch in the intermediate strip for the purpose specified.

48. In a gem setting machine, the combination with a gem chute, of an adjustable member at the lower end of said chute for retarding the movement of the gems and preventing their automatic discharge from said chute.

49. In a gem setting machine, the combination with a gem chute, an adjustable member at the lower end of said chute, said member having its upper surface roughened for retarding discharge of the gems from the chute.

50. In a gem setting machine, the combination with a gem chute having spaced rails, of a member adjustable between the lower ends of said rails for retarding the discharge of the gems from said chute.

51. In a gem setting machine, the combination with a gem chute having spaced rails, of a member adjustable between the lower ends of said rails for retarding the discharge of the gems from said chute, the upper surface of said member being roughened for the purpose specified.

52. In a gem setting machine, the combination with a gem chute comprising spaced rails and spaced strips arranged above said rails, said strips terminating at a distance from the lower ends of the rails, spaced plate springs extending from the under portions of said strips over the lower end portions of the rails, and an adjustable member arranged between the rails and below said plate springs for retarding the discharge of the gems from the chute.

53. In a gem setting machine, a gem chute having its lower end portion roughened for retarding the discharge of gems therefrom.

54. In a gem setting machine, the combination with an anvil, of a gem chute having its lower end arranged adjacent said anvil, the lower end portion of the chute being roughened and arranged substantially on the same level as the top of the anvil for the purpose specified.

55. In a gem setting machine, the combination with a chute for the settings, said chute having a track adapted to be straddled by the settings, a hopper arranged at the upper end of the chute, and an agitator arranged in said hopper and adapted to aid in feeding the settings to said track.

56. In a gem setting machine, the combination with a chute for the settings, said chute having a track adapted to be straddled by the settings, and a strip overhanging said track for retaining the settings thereon and allowing the passage of only one setting at a time along the chute.

57. In a gem setting machine, the combination with a chute for the settings, said chute having a track adapted to be straddled by the settings, and a strip overhanging said track for retaining the settings thereon and allowing the passage of only one setting at a time along the chute, said strip being adjustable with respect to said track for accommodating settings of different dimensions.

58. In a gem setting machine, the combination with a chute for the settings, said chute having a track adapted to be straddled by the settings, a strip overhanging said track for retaining the settings thereon and allowing the passage of only one setting at a time along the chute, thumb screws for adjusting said strips with respect to the track, and springs interposed between said chute and strip, whereby the latter may be arranged at different distance from the track for accommodating settings of different dimensions.

59. In a gem setting machine, the combination with a chute, of a hopper communicating with said chute, and an agitator arranged in the hopper and having resilient radiating arms, certain of said arms being in the form of round loops and other of said arms being in the form of triangular loops for the purpose specified.

60. In a gem setting machine, the combination with a chute, of a hopper having a slot in its base communicating with said chute, the walls of said slot being beveled, and an agitator arranged in the hopper and having resilient radiating arms to fit in said groove between said beveled walls.

61. In a gem setting machine, the combination with an inclined chute, of a hopper having a portion of its bottom formed by the upper part of the chute, a rotary agitator arranged in the hopper, and a strip constituting part of the bottom of the hopper and extending below said agitator to a point on the chute.

62. In a gem setting machine, the combination with an inclined chute, of a hopper having a portion of its bottom formed by the upper part of the chute, a rotary agitator arranged in the hopper, and a strip constituting part of the bottom of the hopper and extending below said agitator to a point on the chute, the portion of said strip arranged below the agitator being curved for the purpose specified.

63. In a gem setting machine, the combination with a chute for the settings, of a hopper communicating with said chute, an agitator in the hopper, said chute having a track adapted to be straddled by the settings, said track extending for a considerable distance into the hopper, whereby the settings may be lined up thereon by the action of said agitator.

64. In a gem setting machine, the combination with a chute for the settings, of a hopper communicating with said chute, an agitator in the hopper, said chute having a track adapted to be straddled by the settings, said track extending for a considerable distance into the hopper, whereby the settings may be lined up thereon by the action of said agitator, there being a strip at the bottom of the hopper extending below the agitator and having its extremity spaced above the track a suitable distance to allow the passage of only one setting at a time along the chute.

65. In a gem setting machine, the combination with a chute for the settings, of a hopper communicating with said chute, an agitator in the hopper, said chute having a track adapted to be straddled by the settings, said track extending for a considerable distance into the hopper, whereby the settings may be lined up thereon by the action of said agitator, there being a strip at the bottom of the hopper extending below the agitator and having its extremity spaced above the track a suitable distance to allow the passage of only one setting at a time along the chute, and a strip arranged parallel to the chute and overhanging said track for retaining the settings thereon and allowing only one of them to pass at a time along the chute after leaving the hopper.

66. In a gem setting machine, the combination with an anvil for supporting a gem, of a chute for conveying settings to a point over said anvil, a resilient support for the setting at the lower end of said chute, and a reciprocating plunger adapted to pick up the lowest setting, to carry it downward while displacing said resilient support, and to apply said setting to a gem on the anvil.

67. In a gem setting machine, the combination with an anvil to support a gem, of a chute for settings having a pocket at its lower end for holding the lowest setting in line with said anvil, a resilient member constituting the floor of said pocket, and a reciprocating plunger adapted to pass through said pocket, to pick up the setting therein, to displace said resilient member, and to apply said setting to a gem on the anvil.

68. In a gem setting machine, the combination with an anvil to support a gem, of a chute for settings having a pocket at its lower end for holding the lowest setting in line with said anvil, a resilient member constituting the floor of said pocket, and a reciprocating plunger adapted to pass through said pocket, to pick up the setting therein, to displace said resilient member, and to apply said setting to a gem on the anvil, the walls of said pocket being resiliently mounted to yield during the passage of the plunger.

69. In a gem setting machine, the combination with an anvil to support a gem, of a chute for conveying settings having depending spurs to a point over said anvil, a track on said chute adapted to be straddled by the spurs of the settings, a pocket at the lower end of the chute for holding the lowest setting in line with the anvil, said track extending to said pocket, a resilient member constituting the floor of the pocket, and a reciprocating plunger adapted to pass through said pocket, to pick up the setting therein, to displace said resilient member, and to apply said setting to a gem on the anvil.

70. In a gem setting machine, the combination with an anvil to support a gem, of a chute for conveying settings having depending spurs to a point over said anvil, a track on said chute adapted to be straddled by the spurs of the settings, a pocket at the lower end of the chute for holding the lowest setting in line with the anvil, said track extending to said pocket and beyond the end of the chute proper, a displaceable resilient member constituting the floor of the pocket, a reciprocating plunger adapted to pass through said pocket, to pick up the setting therein, to displace said resilient member, and to apply said setting to a gem on the anvil, and another resilient member arranged above said displaceable member and adapted to support the prongs of the setting next to the one in the pocket when said next to the lowest setting straddles said extending end portion of the track.

71. In a gem setting machine, the combination with an anvil to support a gem, of a chute for settings having a pocket at its lower end for holding the lowest setting in line with said anvil, a resilient member constituting the floor of said pocket, and a reciprocating plunger adapted to pass through said pocket, to pick up the setting therein, to displace said resilient member, and to apply said setting to a gem on the anvil, said resilient member comprising a looped spring strip having its end portions folded together and secured to the bottom of the chute, the looped portion of said member extending below said pocket.

72. In a gem setting machine, the combination with an anvil to support a gem, of a chute for conveying settings having depending spurs to a point over said anvil, a track on said chute adapted to be straddled by the spurs of the settings, a pocket at the lower end of the chute for holding the lowest setting in line with the anvil, said track extending to said pocket and beyond the end of the chute proper, a displaceable resilient member constituting the floor of the pocket, a reciprocating plunger adapted to pass through said pocket, to pick up the setting therein, to displace said resilient member, and to apply said settings to a gem on the anvil, and another resilient member arranged above said displaceable member and adapted to support the prongs of the setting next to the one in the pocket when said next to the lowest setting straddles said extending end portion of the track, said displaceable resilient member comprising a looped spring having its end portions folded together and secured to the bottom of the chute, the looped portion of said member extending below said pocket, and the other resilient member being arranged above said looped strip and also secured to the bottom of the chute.

73. In a gem setting machine, the combination with an anvil to support a gem, of a chute for settings having a pocket at its lower end for holding the lowest setting in line with said anvil, the walls of said pocket consisting of lateral members having inwardly turned outer ends for preventing the swinging of the settings in the pocket, a resilient member constituting the floor of said pocket, and a reciprocating plunger adapted to pass through said pocket, to pick up the setting therein, and to apply said setting to a gem on the anvil.

74. In a gem setting machine, the combination with an anvil to support a gem, of a chute for settings having a pocket at its lower end for holding the lowest setting in line with said anvil, the walls of said pocket consisting of lateral members having inwardly turned outer ends arranged at right angles to the sides of the pocket for preventing the swinging of the settings in the pocket, a resilient member constituting the floor of said pocket and a reciprocating plunger adapted to pass through said pocket, to pick up the setting therein, and to apply said setting to a gem on the anvil.

75. In a gem setting machine, the combination with a gem chute, of an anvil arranged adjacent the lower end of said chute, said anvil having a recess in its surface for supporting a gem in inverted position, and means for setting said gem upon material while arranged on the anvil.

76. In a gem setting machine, the combination with a gem chute, of an anvil arranged adjacent the lower end of said chute, said anvil having a recess in its surface for supporting a gem in inverted position, the side of the anvil adjacent the chute being notched to guide the gems from said chute onto said anvil, and means for setting said gem upon material while arranged on the anvil.

In testimony whereof I have signed my name to this specification.

EDWARD CULOTTA.